(12) United States Patent
Andon et al.

(10) Patent No.: US 11,096,140 B2
(45) Date of Patent: Aug. 17, 2021

(54) MULTI-MODAL ON-FIELD POSITION DETERMINATION

(71) Applicant: NIKE, INC., Beaverton, OR (US)

(72) Inventors: Christopher Andon, Portland, OR (US); Brian Kash, Portland, OR (US); Ryan Palmer, Tigard, OR (US); Holli Pheil, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 15/774,084

(22) PCT Filed: Nov. 10, 2016

(86) PCT No.: PCT/US2016/061431
§ 371 (c)(1),
(2) Date: May 7, 2018

(87) PCT Pub. No.: WO2017/083585
PCT Pub. Date: May 18, 2017

(65) Prior Publication Data
US 2018/0332661 A1 Nov. 15, 2018

Related U.S. Application Data

(60) Provisional application No. 62/253,562, filed on Nov. 10, 2015.

(51) Int. Cl.
H04W 64/00 (2009.01)
H04L 29/06 (2006.01)
(Continued)

(52) U.S. Cl.
CPC ............. *H04W 64/00* (2013.01); *G01S 5/02* (2013.01); *G01S 5/0205* (2013.01); *G01S 5/14* (2013.01);
(Continued)

(58) Field of Classification Search
CPC ....... H04W 64/00; H04W 4/80; H04W 84/18; H04L 67/38; G01S 5/0205; G01S 5/02; G01S 5/14
See application file for complete search history.

(56) References Cited

U.S. PATENT DOCUMENTS 6,512,478 B1 * 1/2003 Chien ................... G01S 5/0215
340/572.1
9,134,403 B1 * 9/2015 Anderson ................. G01S 1/08
(Continued)

FOREIGN PATENT DOCUMENTS

| CN | 105023209 | 11/2015 |
|---|---|---|
| EP | 3375231 B1 | 10/2020 |

(Continued)

OTHER PUBLICATIONS

"International Application Serial No. PCT/US2016/061431, International Search Report dated Feb. 10, 2017", 4 pgs.
(Continued)

*Primary Examiner* — Gregory B Sefcheck
*Assistant Examiner* — Joshua Smith
(74) *Attorney, Agent, or Firm* — Schwegman Lindberg & Woessner, P.A.

(57) ABSTRACT

A system, devices, and methods include a player network hub and relay network hubs. The player network hub is configured to form a body area network with peripheral devices by communicating wirelessly according to a first wireless protocol and transmit location information according to a second wireless protocol different than the first wireless protocol. The relay network hubs are configured to form a wide area network with the player network hub and a master network hub by communicating, at least in part, according to the second wireless protocol, wherein the relay network hubs are configured to receive the location information from the player network hub and wherein at least one (Continued)

of the relay network hubs or the master network hub are configured to determine a location of the player network hub based on the location information.

44 Claims, 8 Drawing Sheets

(51) Int. Cl.
*H04W 4/80* (2018.01)
*G01S 5/14* (2006.01)
*G01S 5/02* (2010.01)
*H04W 84/18* (2009.01)

(52) U.S. Cl.
CPC .............. *H04L 67/38* (2013.01); *H04W 4/80* (2018.02); *H04W 84/18* (2013.01)

(56) References Cited

U.S. PATENT DOCUMENTS

| | | | |
|---|---|---|---|
| 2004/0178955 A1* | 9/2004 | Menache | G01S 5/0247 342/463 |
| 2005/0201301 A1* | 9/2005 | Bridgelall | H04W 4/203 370/254 |
| 2006/0029010 A1* | 2/2006 | Belcea | H04W 84/18 370/310 |
| 2008/0002031 A1* | 1/2008 | Cana | G01S 13/74 348/208.14 |
| 2008/0026770 A1* | 1/2008 | Rudravaram | H04W 64/00 455/456.1 |
| 2008/0117886 A1* | 5/2008 | Kim | H04L 12/4625 370/338 |
| 2010/0063652 A1 | 3/2010 | Anderson | |
| 2010/0141531 A1 | 6/2010 | Nam et al. | |
| 2010/0315225 A1* | 12/2010 | Teague | H04W 88/04 340/539.12 |
| 2012/0030304 A1 | 2/2012 | Cho et al. | |
| 2013/0028245 A1* | 1/2013 | Oerton | H04W 4/00 370/338 |
| 2013/0029685 A1* | 1/2013 | Moshfeghi | G01S 19/48 455/456.1 |
| 2013/0211270 A1* | 8/2013 | St. Laurent | G01S 13/756 600/508 |
| 2013/0222185 A1 | 8/2013 | Ben et al. | |
| 2014/0324291 A1* | 10/2014 | Jones | G01S 19/14 701/41 |
| 2015/0179007 A1 | 6/2015 | Todaka | |

FOREIGN PATENT DOCUMENTS

| | | |
|---|---|---|
| WO | WO-2014197618 A2 | 12/2014 |
| WO | WO-2015126182 A1 | 8/2015 |
| WO | WO-2017083585 A1 | 5/2017 |

OTHER PUBLICATIONS

"International Application Serial No. PCT/US2016/061431, Written Opinion dated Feb. 10, 2017", 8 pgs.

"International Application Serial No. PCT/US2016/061431, International Preliminary Report on Patentability dated May 24, 2018", 10 pgs.

"European Application Serial No. 16865047.1, Extended European Search Report dated Jul. 2, 2019", 14 pgs.

"European Application Serial No. 16865047.1, Response filed Jan. 21, 2019 to Communication Pursuant to Rules 161 & 162 dated Jul. 11, 2018", 20 pgs.

Benoit, Latre, "A survey on wireless body area network", Wireless Networks ; The Journal of Mobile Communication, Computation and Information, Kluwer Academic Publishers, DO, vol. 17, No. 1, (Nov. 11, 2010), 18 pgs.

Hamie, J, et al., "Joint motion capture and navigation in heterogeneous Body Area Networks with distance estimation over neighborhood graph", Positioning Navigation and Communication (WPNC), 2013 10th Workshop on, IEEE,, (Mar. 20, 2013), 29 pgs.

Min, Chen, et al., "Body Area Networks", Mobile Networks and Applications, ACM, New York, NY, US, vol. 16, No. 2, (Apr. 1, 2011), 18 pgs.

Saeed, Rashwand, et al., "Two-tier WBAN/WLAN healthcare networks; priority considerations", Global Communications Conference (GLOBECOM), 2012 IEEE, IEEE,, (Dec. 3, 2012), 6 pgs.

"European Application Serial No. 16865047.1, Response filed Jan. 15, 2020 to Extended European Search Report dated Jul. 2, 2019", 12 pgs.

"Chinese Application Serial No. 201680073481.6, Office Action dated Dec. 31, 2019", w English Translation, 16 pgs.

"Chinese Application Serial No. 201680073481.6, Response filed May 14, 2020 to Office Action dated Dec. 31, 2019", w/ English claims, 51 pgs.

"Chinese Application Serial No. 2016800734816, Office Action dated Jul. 14, 2020", w/ English translation, 7 pgs.

"Chinese Application Serial No. 2016800734816, Response filed Nov. 13, 2020 to Office Action dated Jul. 14, 2020", w/ English claims, 47 pgs.

"European Application Serial No. 20185626.7, Extended European Search Report dated Oct. 29, 2020", 6 pgs.

Latre, Benoit, et al., "A survey on wireless body area networks", Wireless Networks ; The Journal of Mobile Communication, Computation and Information, Kluwer Academic Publishers, DO, vol. 17, No. 1, (Nov. 11, 2010), 1-18.

* cited by examiner

MULTI-MODAL ON-FIELD POSITION DETERMINATION

CLAIM OF PRIORITY

This application is a U.S. National Stage Filing under 35 U.S.C. 371 from International Patent Application Ser. No. PCT/US2016/061431, filed Nov. 10, 2016, published on May 18, 2017 as WO 2017/083585 A1, which application claims the benefit of priority of U.S. Provisional Patent Application Ser. No. 62/253,562, filed on Nov. 10, 2015, both of which are incorporated by reference herein in their entireties.

TECHNICAL FIELD

The subject matter disclosed herein generally relates to multi-modal on-field position determination.

BACKGROUND

People who engage in athletic activities such as basketball, football/soccer, baseball or softball, and the like conventionally do so on a field of play. The field of play may be any specified area and, in such athletic activities, conventionally have specifically delineated boundaries. As the players move about the field of play, they may exert themselves in various ways and utilize different equipment. Mangers or other non-playing personnel may monitor their activity and provide instructions or recommendations.

BRIEF DESCRIPTION OF THE DRAWINGS

Some embodiments are illustrated by way of example and not limitation in the figures of the accompanying drawings.

DETAILED DESCRIPTION

Example methods and systems are directed to multi-modal on-field position determination. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

The management of electronic information in athletic activities detailed above has conventionally been ad hoc and dependent on individual peripheral devices. Players may wear peripheral devices that measure physiologic parameters of themselves, permit communication with non-playing personnel, and so forth. However, such peripheral devices may not generally be networked with respect to one another, either for individual players, generally, or both. Thus, for instance, if a manager wants to know physiologic information or performance data about a player, the manager may need to individually collect and correlate such data. Moreover, while attempts have been made to determine a location of players on the field in athletic events, such systems have typically relied on optical systems and/or may be based on separate devices apart from other peripheral, physiological sensors and the like.

A system has been developed that provides for multiple area networks according to different wireless communication protocols. One or more players may have a body area network formed by a player network hub. The body area network may include multiple peripheral devices as and may communicate according to a first wireless protocol. The player network hubs may establish with or join a wide area network formed by relay network hubs according to a second wireless protocol. The wide area network may provide both for the capacity to transmit data from peripheral devices as well as determine a location of individual player network hubs on the field of play. The different wireless protocols provide for optimized distance communication in a way that may also limit interference between the body area networks and the wide area network. Locations may be determined in conjunction with the transmittal of other data to and from the players.

Figure 1:
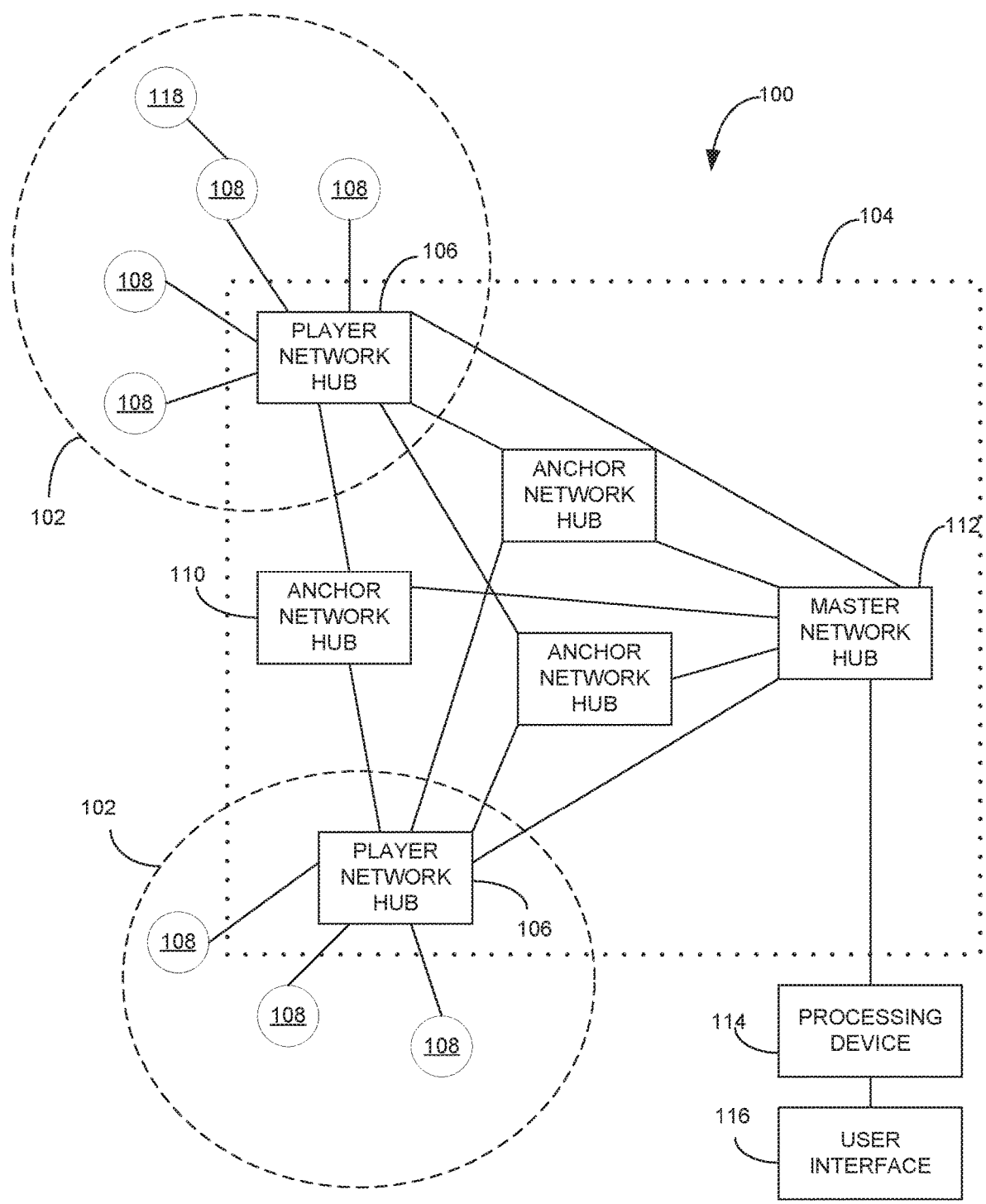
FIG. 1 is a diagram of a system for using multi-modal wireless communication in an athletic activity, in an example embodiment.

FIG. 1 is a diagram of a system 100 for using multi-modal wireless communication in an athletic activity, in an example embodiment. The system 100 creates one or more body area networks 102 including and based on individual devices (e.g., peripheral devices 108, below). Some or all of the devices may be associated with an individual player or other individual associated with the athletic activity, e.g., an individual playing in or being a member of a team that is playing in the athletic activity. The system 100 further creates a wide area network 104 associated with multiple players and/or other entities associated with the athletic activity, including the player associated with the body area network 102. The body area network 102 is generated and maintained according to a first wireless protocol and the wide area network 104 is generated and maintained according to a second wireless protocol different than the first wireless protocol. In various examples, the first wireless protocol has a shorter communication range than the second wireless protocol. In an example, the first wireless protocol is according to a Bluetooth Low Energy (BLE) wireless protocol and the second wireless protocol is according to an ultra-wide band (UWB) wireless protocol, as known in the art.

The system 100 includes one or more player network hubs 106. The player network hub 106 is configured to communicate according to both the first wireless protocol and the second wireless protocol. The player network hub 106 may take the form of a discrete device or "tag" that is configured to be secured with respect to a player in the athletic activity, e.g., by attaching to the player's person or to attaching to or being integrated in apparel or another article the player is wearing. The system 100 further includes peripheral devices 108 that, in combination with the player network hub 106, comprise the body area network 102. The peripheral devices 108 may include devices that are similarly secured with respect to the player or which otherwise operate so as to sense and provide data, including physiologic data, to or regarding the player, such as a heart rate monitor, respiration monitor, moisture and/or sweat sensor, a device to facilitate communications between the player and other players, coaches, managers, and the like, and so forth. The peripheral devices 108 may also sense or interact with other, ancillary devices, such as equipment utilized in the athletic activity, e.g., a sport ball, bat, golf club, etc.

As will be described herein, the peripheral devices 108 may transmit data to and receive data from the player network hub 106. The player network hub 106 may transmit the data to and receive data from other devices and/or hubs that make up the wide area network 104. As will further be disclosed herein, the player network hub 106 may transmit data that allows components of the wide area network 104 to determine a position of the player network hub 106 and, by extension, the player with respect to whom the player network hub 106 is secured, on a field of play. Thus, the body area network 102 generally obtains information about the player and transmits that along with positional information that allows components of the wide area network 104 to determine positional, physiological, and/or other information about the player substantially in real time.

The wide area network 104 includes the player network hub 106 as well as relay network hubs 110 and at least one master network hub 112. In various examples, the system 100 generally, and/or the wide area network 104 specifically, further include a processing device 114 and a user interface 116. It is to be understood that the processing device 114 and/or the user interface 116 may be local to the wide area network 104 or may be accessed remotely or as a "cloud" resource. As such, in various examples, the system 100 and/or the wide area network 104 may either utilize the processing device 114 and the user interface 116 directly or may access the processing device 114 and the user interface 116 remotely. The processing device 114 and user interface 116 may be a single device, e.g., a mobile device, such as a mobile phone, tablet computer, personal digital assistant, and the like, a comparatively fixed device, e.g., a personal computer, laptop computer, or server, or a combination of one or more mobile devices operating in conjunction with a comparatively fixed device, such as one or more mobile devices communicatively coupled to a server or personal computer.

The relay network hubs 110 are established in relative known locations with respect to a reference, such as the field of play, as will be illustrated herein. While the term "relay network hub" is utilized to describe those hubs as the relay network hubs 110 typically pass information between and among the player network hubs 106 and master network hub 112, it is to be recognized and understood that the relay network hubs 110 may perform functions that do not involve relaying information of any kind. In various examples, one or more of the relay network hubs 110 are in fixed positions. In various examples, one or more of the relay network hubs 110 are dynamically repositionable and configured to determine their respective locations as or after they move about. In an example, the relay network hubs 110 are configured to communicate at least according to the second wireless protocol to facilitate the transmission of information from the peripheral devices 108 to the master network hub 112. The relay network hubs 110 may further be configured to append data, such as distance data or time data, to transmissions from a player network hub 106 or otherwise provide information for determining, in conjunction with information from other relay network hubs 110, a position of some or all of the player network hubs 106 on the field of play, as will be disclosed herein.

The master network hub 112 is communicatively coupled to the relay network hubs 110 at least according to the second wireless protocol. The master network hub 112 is configured to obtain data from the relay network hubs 110 and/or, in certain examples, from the player network hubs 106. In various examples, the master network hub 112 is configured to implement a location engine that is configured to utilize distance and/or time data as received to determine a position of the player network hub 106 and, by extension, an associated player network hub 106 on the field of play. In further examples, the master network hub 112 is configured to transmit the information from the peripheral devices 108 to the processing device 114 for use in analytics related to the player associated with the player network hub 106.

As will be disclosed in further detail herein, the system 100 optionally further includes one or more ancillary devices 118 that may be utilized temporarily as part of a body area network 102 during the course of the athletic activity. The ancillary devices 118 may be articles such as a ball and or other equipment that is used in playing a game on the field of play or may be other devices, such as cameras, sound recording devices, and so forth, which may aid in the broadcasting or otherwise capturing and recording aspects of the athletic activity. The ancillary devices 118 may transition between and among individual body area networks 102; for instance, as a ball is passed between and among players in the athletic activity, the ball may be a component of the body area network 102 of the player or players who are in possession of or otherwise in close proximity of the ball at any given moment and then no longer part of the body area network 102 when the player passes, shoots, or otherwise loses possession of the ball.

Figure 2:
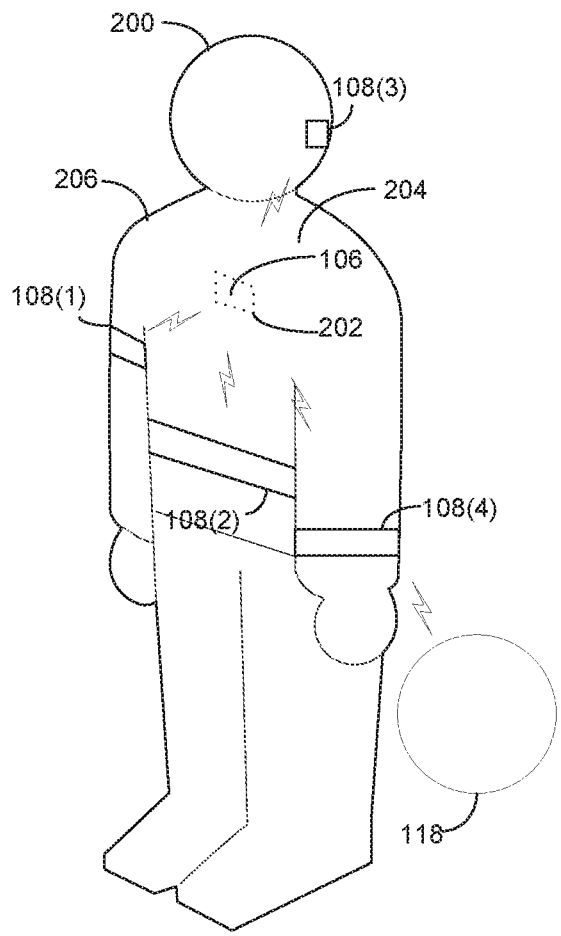
FIG. 2 is a depiction of a body area network in relation to a player in an athletic activity, in an example embodiment.

FIG. 2 is a depiction of a body area network 102 in relation to a player 200 in an athletic activity, in an example embodiment. In the illustrated example, the player network hub 106 is secured with respect to the player 200 by being secured to a holder 202 which is itself secured to the back 204 of a uniform shirt or jersey 206 that is worn by the player 200 during the athletic activity. As illustrated, the holder 202 is positioned on the jersey 206 so as to be positioned generally between the shoulder blades of the player 200 when the jersey 206 is being worn by the player 200. It is emphasized that this mechanism for securing the player network hub 106 with respect to the player is not limiting and that any suitable mechanism for securing the player network hub 106 to or with respect to the player 200, including securing the player network hub 106 to the player 200 personally, to other locations on the jersey 206, or to other articles of apparel or equipment on or possessed by the player 200 instead of or in addition to the jersey 206 are contemplated.

The peripheral devices 108 include various devices that may be utilized by the player 200. In the illustrated, non-limiting example, the peripheral devices 108 include a heart rate monitor 108(1), a respiration and moisture/sweat sensor 108(2), an audio communication device 108(3) configured to be seated in an ear of the player 200, and a wrist-wearable device 108(4) configured to sense motion and communicate with an ancillary device 118. As illustrated, the ancillary device 118 is in sufficient proximity of the wrist-wearable device 108(4) to communicate according to a wireless protocol, such as the first wireless protocol or according to a third wireless protocol different than the first and second wireless protocols. As such, with the ancillary device 118 sufficiently close to the wrist-wearable device 108(4), the ancillary device 118 is considered to be part of the body area network 104.

As described herein, the peripheral devices 108 and the ancillary device(s) 118 may transmit information to the player network hub 106. Thus, in the illustrated example, the heart rate monitor 108(1) transmits heart rate information, the respiration and moisture/sweat monitor 108(2) transmits respiration and moisture data, and so forth. The peripheral devices 108 may also receive information from or via the player network hub 106. In an example, the player network hub 106 receives audio communications via the second wireless protocol and forwards or relays the audio communication according to the first wireless protocol to the audio communication device 108(3). The peripheral devices 108 and/or the ancillary device(s) 118 may communicate between and among each other according to the first wireless protocol and/or any other suitable wireless protocol. Thus, in an example, the wrist-wearable device 108(4) may receive heart rate data from the heart rate monitor 108(1) and display heart rate data on a user interface in a way that is viewable by the player 200.

Figure 3A:
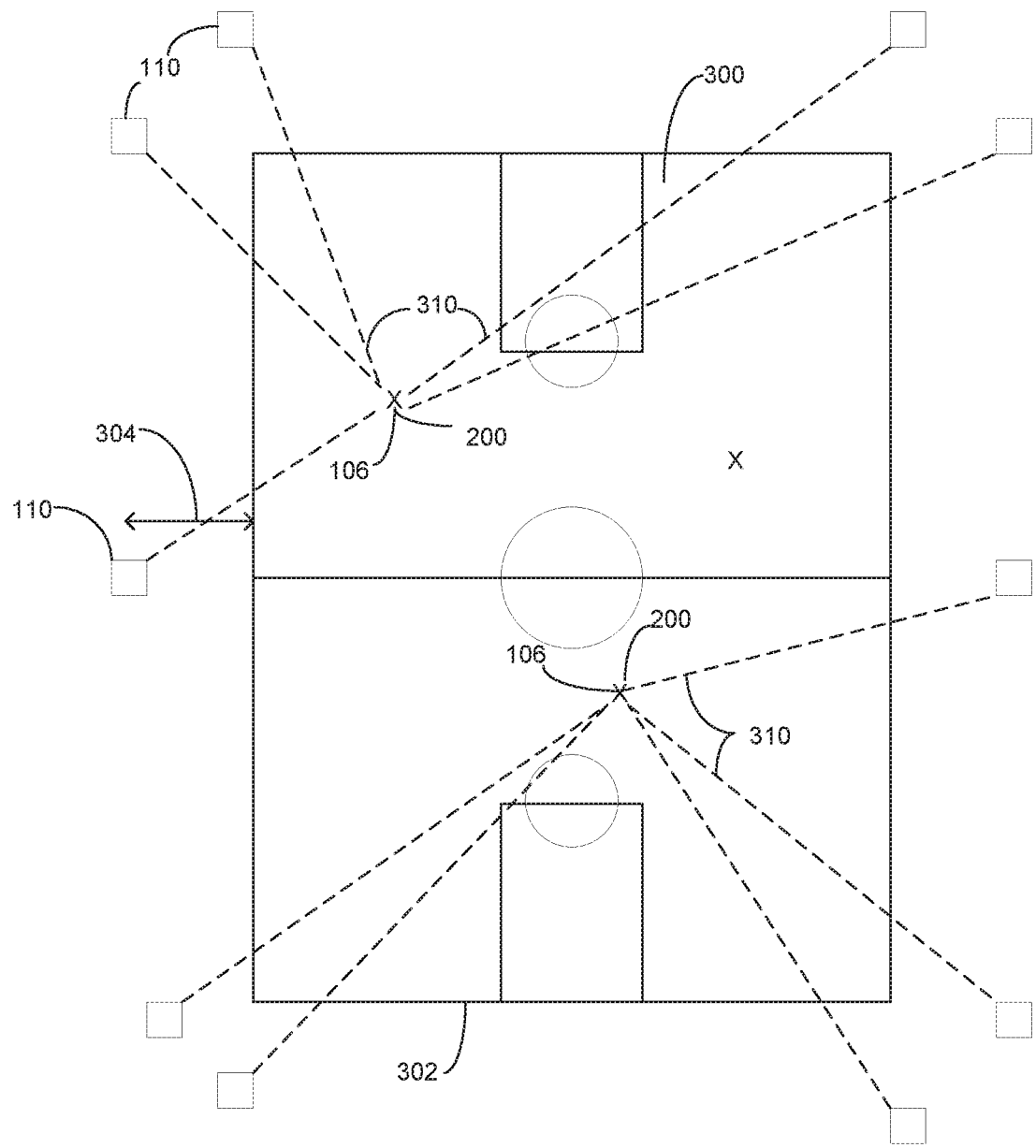
FIGS. 3A-3C are depictions of the wide area network on a field of play, in an example embodiment.

FIG. 3A is an abstract depiction of the wide area network 104 in which the reference is a field of play 300, in an example embodiment. Some players 200 are arrayed on the field of play 300. In the illustrated example, relay network hubs 110 are arrayed around a periphery 302 of the field of play 300 at predetermined locations set back from the periphery 302. As illustrated, ten (10) relay network hubs are arrayed around the periphery 302 at a distance 304 of approximately five (5) feet or 1.5 meters to ten (10) feet or 3.0 meters to the periphery 302. Additionally or alternatively, the relay network hubs 110 may be set on the periphery 302 or within the field of play 300. In various examples, the relay network hubs 110 are positioned at least approximately ten (10) feet or three (3) meters above a ground, floor, or other general horizontal surface, though heights of less than ten (10) feet or three (3) meters are contemplated, including being positioned on, under, or within the ground, floor, or horizontal surface.

The wide area network 104 further includes the master network hub 112 communicatively coupled to at least the relay network hubs 110 and, in various examples, to the player network hubs 106 according to the second wireless protocol. Additionally or alternatively, the relay network hubs 110 may be communicatively coupled to the maser network hub 112 using a wired network, as known in the art. In various examples, the player network hubs 106 communicate information from the peripheral devices 108 and/or the ancillary device(s) 118 directly to the master network hub 112 or via one or more relay network hubs 110.

In various additional or alternative examples, some or all of the relay network hubs 110 and the master network hub 112 are mobile and repositionable. Such mobile and repositionable hubs 110, 112 may operate along a track or other constraining apparatus or surface or as autonomous or remote controlled vehicles. The autonomous or remote controlled vehicles may be land or aerial vehicles of any of a variety of types. The vehicles may include the componentry of the associated relay network hub 110 and master network hub 112 as well as necessary a power supply or power source to operate the vehicle as well as the hub 110, 112 componentry and vehicular control systems.

In various examples, where an relay network hub 110 is or is a component of an autonomous vehicle or "drone", the vehicle may be programmed or directed to move to and maintain a position relative to the field of play 300 as illustrated herein. Thus, in an example, the vehicle may be programmed to drive or fly to the position and then maintain the position for the duration of the activity or until the relay network hub 110 could be repositioned in a manner that would not interfere with location determination activities as disclosed herein. In various examples, several or all of the relay network hubs 110 are configured to autonomously arrange themselves with respect to the field of play 300 in an orientation to facilitate location determination of the player network hubs 106.

In various examples, the vehicles for the relay network hubs 110 include positioning sensors, such as with the global positioning system (GPS) and/or global or local relative positioning sensors, to establish their position with respect to the field of play 300 and with respect to other vehicles/relay network hubs 110. The vehicles may also control their elevation or a height of an antenna or other aspect of the relay network hub 110. Base on commands from the master network hub 112, the vehicles/relay network hubs 110 may be configured to dynamically reposition themselves in real time.

Figure 3B:
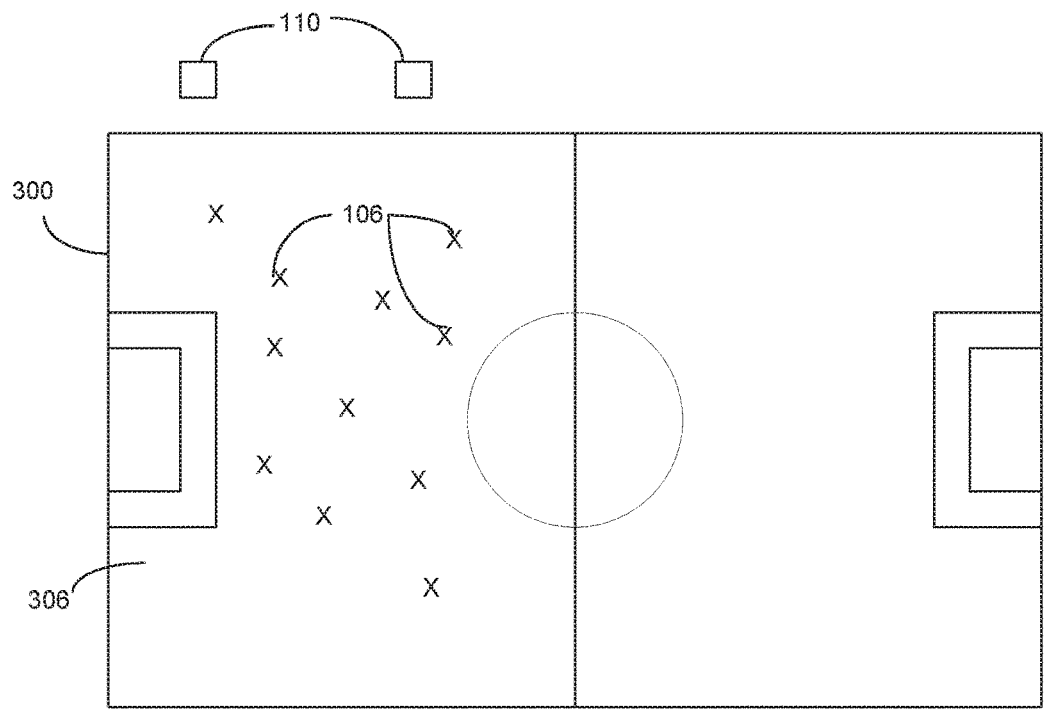
Figure 3C:
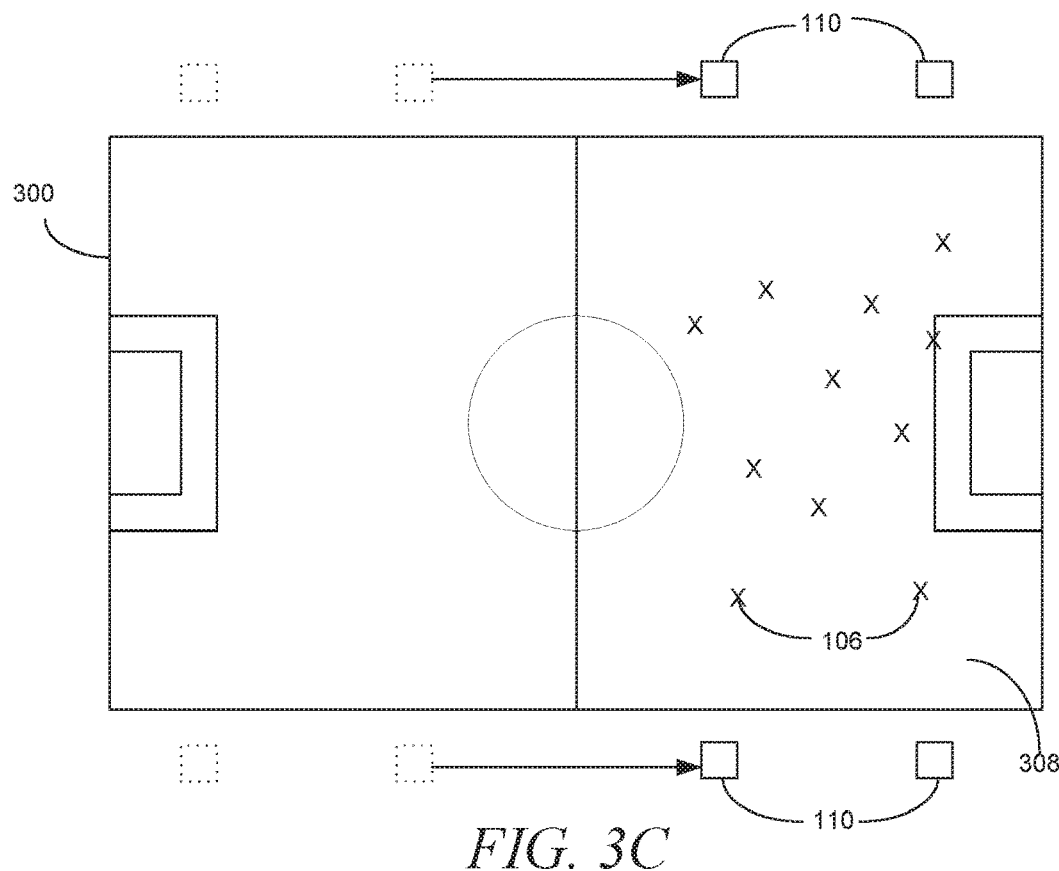

FIGS. 3B and 3C illustrate dynamic and autonomous repositioning of the relay network hubs 110 in relation to shifting of player network hubs 106 on the field of play 300, in an example embodiment. At a first time, illustrated in FIG. 3B, several relay network hubs 110 are positioned with respect to a first half 310 of the playing field in or on which the player network hubs 106 are currently positioned. Over the course of the athletic activity, the players 200 and their player network hubs 106 shift to a second half 308 of the field of play 300, as illustrated in FIG. 3C. Based on the determined locations of the players by the location engine of the master network hub 112, the master network hub 112 instructs the relay network hubs 110 to reposition with respect to the playing field 300 so that the player network hubs 106 remain within communication range of the relay network hubs 110. If the locations of the player network hubs 106 diverge such that an relay network hub 110 is unable to maintain communication with all of the player network hubs 106 then the relay network hub 110 may reposition to maintain communication with as many player network hubs 106 as possible or according to any of a variety of other criteria, e.g., relay network hubs 106 may be repositioned to attempt to maintain the ability to determine the location of the most possible player network hubs 106 or to provide communication with as many player network hubs 106 as possible.

While the dynamic repositioning of the relay network hubs 110 is described above with respect to commands from the master network hub 112 based on determined locations of the player network hubs 106, it is to be understood that any of a variety of factors may be utilized to reposition the relay network hubs 110. In various examples, the relay network hubs may be remotely controlled by an operator or may respond to inputs directly from the player network hubs 106. Any additional sensory information may be generated and provided to the relay network hubs 110 to facilitate appropriate repositioning of the relay network hubs 110 during the athletic activity.

The master network hub 112 may incorporate the same or similar capabilities as the relay network hubs 110 regarding autonomous or remotely controlled vehicles. The master network hub 112 may further incorporate visual or audio sensors for tracking an ancillary device 118, such as a ball, to supplement or replace mechanisms for tracking the ancillary device 118 as disclosed herein. Further, the master network hub 112 may incorporate the user interface 116 or another user interface to provide information generated or received by the master network hub 112 to personnel during the athletic activity. Thus, by way of example, if a referee desires to know if a player 200 went out of bounds during the athletic activity, the referee may summon the master network hub 112 vehicle to proceed to the referee and display information relevant to whether or not the player 200 stepped out of bounds.

Figure 4:
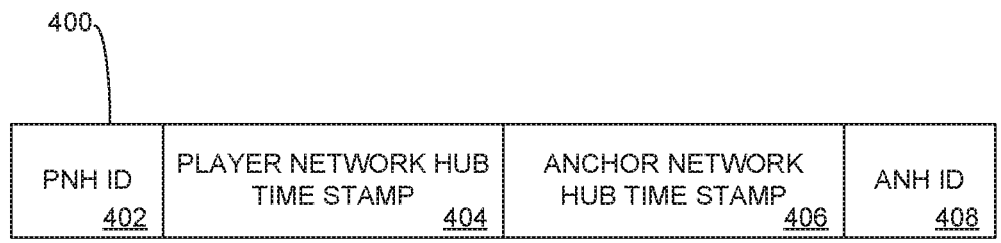
FIG. 4 is a diagram of a data packet included in a signal transmitted by a player network hub, in an example embodiment.

FIG. 4 is a diagram of a data packet 400 included in a signal (310, FIG. 3) transmitted by a player network hub 106, in an example embodiment. In order to determine a location of the player network hub 106 on the field of play 300 and, by extension, the associated player, the player network hub 106 broadcasts the signal 310 including the data packet 400. The data packet 400 includes a unique identifier field 402 for the player network hub 106 and a player network hub timestamp 404 of the time of transmission of the signal or of a time having a known relation to the time of the signal (e.g., 100 microseconds prior to the time of actual transmission of the signal). Each relay network hub 110 that receives the signal 310 and data packet 400 appends an relay network hub timestamp 406 associated with a time of receipt of the signal 310 and data packet 400 by the network hub 110 as well as an relay network hub identifier 408. The relay network hub 110 then transmits the data packet 400 to the master network hub 112.

As noted, the above procedure for generating a data packet 400 is repeated by some or all of the relay network hubs 110 that receive the signal 310 and data packet 400. Each relay network hub 110 that receives the data packet 400 therefore creates its own unique instance of the data packet 400. Thus, a first relay network hub 110 generates a first data packet 400 and transmits the first data packet 400 to the master network hub 112, a second relay network hub 110 generates a second data packet 400 and transmits the second data packet 400 to the master network hub 112, and so forth.

The master network hub 112 collects the various data packets 400 as received from the relay network hubs 110 and utilizes those data packets 400 to determine the location of the player network hub 106. In particular, the master network hub 112 utilizes the location engine to determine location information, e.g., a distance between the player network hub 106 and the associated relay network hub 110 by multiplying the difference between the time stamps 404, 406, by the transmission speed of the second wireless protocol, e.g., the speed of light, to establish the distance between the player network hub 106 and the associated relay network hub 110. By utilizing conventional triangulation techniques known in the art, the location engine of the master network hub 112 may determine the location on the field of play 300 of the player network hub 106 based on distance measurements from at least three (3) relay network hubs 110.

The methodologies described herein for adding data to the data packet 400 are described with respect to the origination of the data packet 400 at the player network hub 106 and passing through the relay network hub 110 in route to the master network hub 112. In that way, the player network hub 106 broadcasts the data packet 400 and the relay network hub 110 relays the data packet 400. However, in various examples, the reverse may be implemented according to the principles described herein, with the relay network hub 110 broadcasting the data packet 400 with a time stamp 406 and, upon the player network hub 106 receiving the data packet 400, the player network hub 106 adds the time stamp 404 and relays the data packet 400 to the master network hub 112.

Further, while the location engine of the master network hub 112 is described as determining the distance between the player network hub 106 and the relay network hub 110, it is to be understood that the determination of the distance may be made at the relay network hub 110 based on the time stamp 404 and the time at which the data packet 400 was received. In such an example, the relay network hub 110 is configured to compute the distance between the player network hub 106 and the relay network hub 110 with the relay network hub's 110 own resources. The relay network hub 110 may then transmit the distance as determined to the master network hub 112 instead of or in addition to the data packet 400. Per the principles described above, this process may be reversed where the relay network hub 110 broadcasts the data packet 400 and the player network hub 106 receives the data packet 400, in such an example, the player network hub 106 may determine the distance and forward the distance to the master network hub 112.

Figure 5:
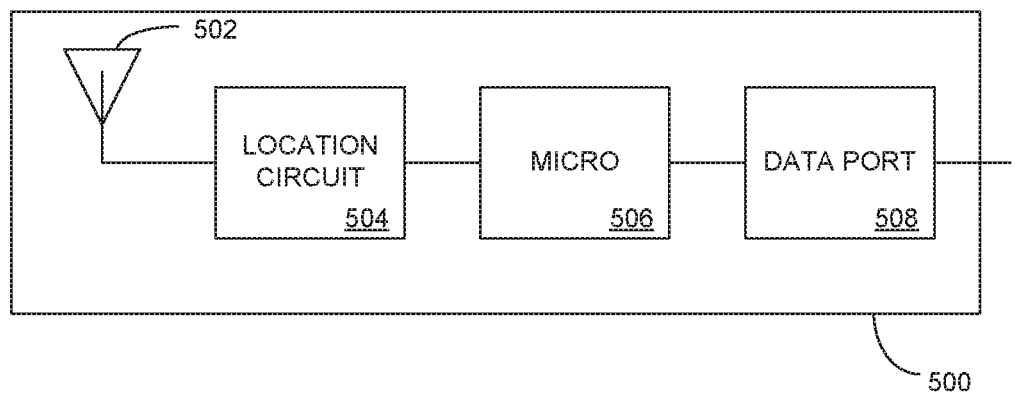
FIG. 5 is a block-level depiction of a wireless communication tag configured to communicate according to a second wireless protocol, in an example embodiment.

FIG. 5 is a block-level depiction of a wireless communication tag 500 configured to communicate according to the second wireless protocol, in an example embodiment. The wireless communication tag 500 includes an antenna 502, a location circuit 504 configured to be or to implement the location engine disclosed herein, a microcontroller 506, and a wired data port 508, in an example embodiment. In various examples, the antenna 502 is configured to communicate at least according to the second wireless protocol. In various examples, the antenna 502 is multiple individual antennas in various configurations and orientations to enable communication according to multiple wireless protocols, including the first and the second wireless protocols.

The location circuit 504 may be configured to generate the data packet 400 for transmittal via the antenna 502. In an example, the location circuit 504 is a DW 1000 chip by DecaWave Ltd., though any suitable location circuit or circuit configured to implement the location engine may be utilized. The microcontroller 506 is configured to control the operation of the location circuit 504 and manage data transmitted and received via the wired data port 508. The wired data port 508 may be a universal serial bus (USB) to serial data converter or any other suitable data converter.

In various examples, the wireless communication tag 500 may be utilized in the same or essentially similar configuration within some or all of the player network hub 106, the relay network hub 110, and the master network hub 112, with the difference between the operation of the hubs 106, 110, 112 being determined, in part, by what componentry is coupled to the wired data port 508 as well as the programming of the microcontroller 506. In an example, the player network hub 106 and the relay network hub 110 are each comprised of one wireless communication tag 500 coupled to a power source. In various examples, the power source for the player network hub 106 is a battery or other mobile power source, such as a kinetic energy generator, while the power source for the relay network hub 110 is variously either mobile, such as a battery, or to a main power source, such as a wall outlet. In an example, the master network hub 112 is formed with one wireless communication tag 500 coupled to or incorporated within a computing device, such as the processing device 114. In the example of the player network hub 106, the antenna 502 may be configured to transmit and receive data according to both the first and second wireless protocols.

Figure 6:
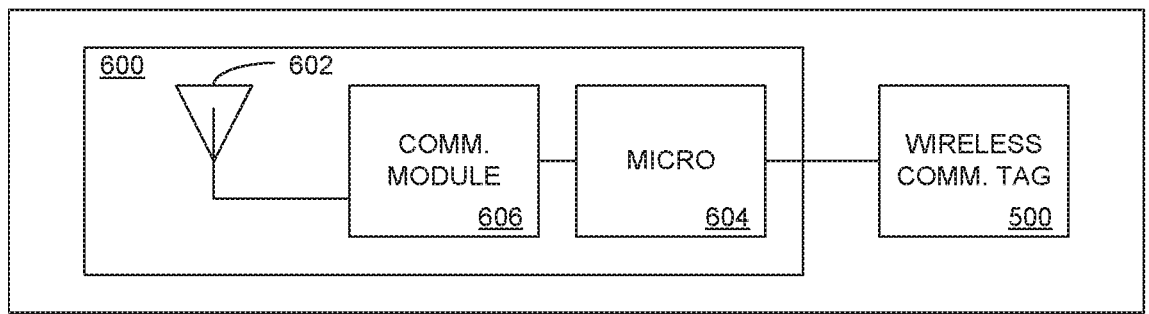
FIG. 6 is a block-level diagram of an alternative example of a player network hub, in an example embodiment.

FIG. 6 is a block-level diagram of an alternative example of the player network hub 106, in an example embodiment. In the illustrated example, the player network hub 106 incorporates a wireless communication tag 500 and a body area network hub 600 coupled to the wireless communication tag 500 via the wired data port 508. In such an example, the wireless communication tag 500 is configured to communicate according to the second wireless protocol while the body area network hub 600 is configured to communicate according to the first wireless protocol. Variously, the wireless communication tag 500 and the body area network hub 600 are coupled with respect to one another via a wired communication connection or via a wireless communication connection. In examples where the connection is via a wireless communication connection, the wireless communication connection may be via the first wireless protocol or according to a third wireless protocol different than the first and second wireless protocols, or any suitable wireless protocol. In such an example, the player network hub 106 may be two or more discrete components, i.e., the wireless communication tag 500 and the body area network hub 600, implemented and spaced physically separately but working in coordination to provide the functionality of the player network hub 106.

The body area network hub 600 otherwise includes componentry to facilitate the communication with, between, and among the peripheral devices 108 and the ancillary devices 118. Thus, the body area network hub 600 may, in various examples, include an antenna 602 configured to communicate according to the first wireless protocol, a microcontroller 604, and a communication module 606 configured to communicate according to the first wireless protocol via the antenna 602. The microcontroller 604 may be omitted in examples where the microcontroller 506 is configured to control the communication module 606. Additional circuitry of the body area network hub 600, such as a data port and a power source are optionally included by omitted for clarity. It is noted that one or both of the body area network hub 600 and the wireless communication tag may 500 may incorporate a power source and provide power to the player network hub 106 generally, or a power source may be included as a component of the player network hub 106 independent of the wireless communication tag 500 and body area network hub 600.

Figure 7:
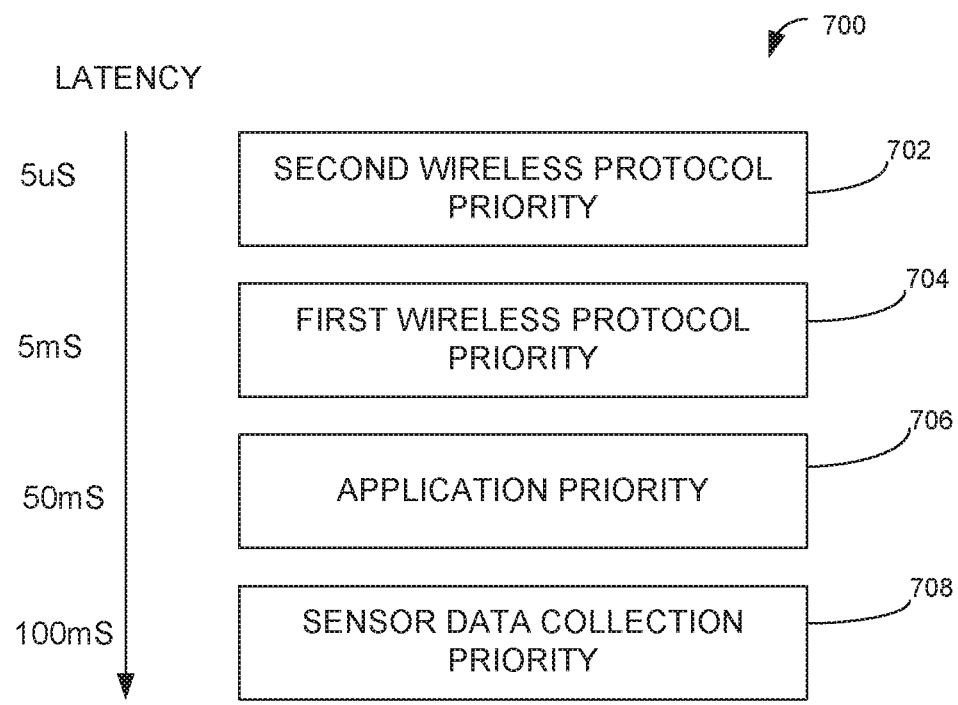
FIG. 7 is a diagram for managing communication priority within a player network hub, in an example embodiment.

FIG. 7 is a diagram 700 for managing communication priority within the player network hub 106, in an example embodiment. Supporting dual wireless protocols, i.e., the first and second wireless protocols, in the player network hub 106 may be supported by managing computing and wireless resources of the player network hub 106, including, in certain examples, only one microcontroller 506. Further, supporting dual wireless protocols may involve managing radio frequency performance of both the first and second wireless protocols effectively concurrently.

In an example, the microcontroller 506 effectively divides the main tasks of the player network hub 106 into priorities and provides a framework, illustrated in priority diagram 700, for management of each subroutine based on how critical the subroutine is to system continuity. The priority diagram 700 details, in order of precedence, four priorities: a second wireless protocol (e.g., ultra-wide band) priority 702; a first wireless protocol (e.g., BLE) priority 704, e.g., for connections to the peripheral devices 108; an application priority 706; and a sensor data collection priority 708. Transmissions related to the second wireless protocol, e.g., location requests, may have a highest single priority (702) and supersede attempts by the microprocessor 506 to, e.g., provide user interaction via a user interface (706).

In an example, the priorities 702, 704, 706, 708 may be based on or may tend to produce a predetermined latency in transmissions which underlie the priorities. The priorities 702, 704, 706, 708 may be set in order to produce desired maximum latencies. In an example, the second wireless protocol priority 702 has a latency of approximately five (5) microseconds, the first wireless protocol latency priority 704 has a latency of approximately five (5) milliseconds, the application priority 706 has a latency of approximately fifty (50) milliseconds, and the sensor data collection priority 708 has a latency of approximately one hundred (100) milliseconds. It is emphasized that the latency values above are illustrative and not limiting on alternative example implementations.

Dividing the priorities 702, 704, 706, 708 as illustrated may provide for the system to function efficiently by allowing more critical routines to get the service latency those routines require or otherwise efficiently utilize, while minimizing the impact to the lower priority systems. Once a higher priority interrupt is completed, operation returns to the lower priority routine that had received the interruption. The priority system illustrated in the diagram 700 may prevent or mitigate some or all problems associated with a single threaded system. However, in various examples conflicts between the first and second wireless protocols may persist owing to interferences created between the differences in timing between the first and second wireless protocols.

Figure 8:
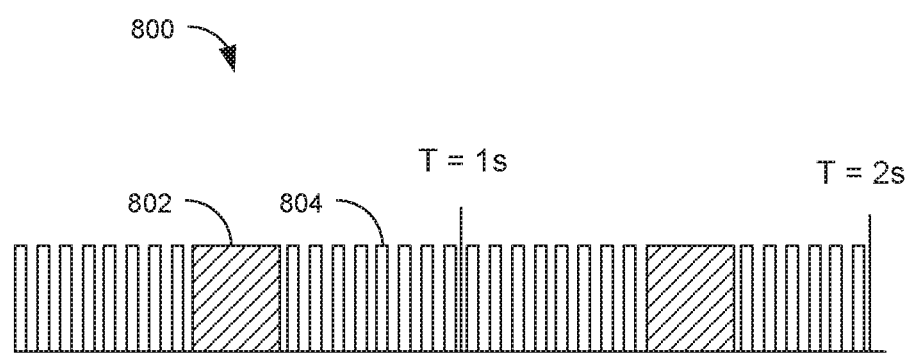
FIG. 8 illustrates a time domain management scheme of the first and second wireless protocols, in an example embodiment.

FIG. 8 illustrates a time domain management scheme 800 of the first and second wireless protocols, in an example embodiment. Performance of the player network hub 106 may be further or alternatively enhanced through the time domain management of protocol routines. In the illustrated example, the first wireless protocol is BLE communicating 802 at one (1) Hertz and the second wireless protocol is UWB communicating 804 at twenty (20) Hz. In the illustrated example, the BLE stack and UWB subroutines correspond to the first wireless protocol priority 704 and the second wireless protocol priority 702, respectively. The BLE stack and UWB subroutines are entered into quickly and returned quickly to meet latency requirements of the first and second wireless protocols. However, the BLE stack and UWB subroutines may be set up to receive timer based interrupts that assign regular start times for the management of the modalities. This management is something that can be accounted for in the microcontroller code as implemented by the microcontroller 506 and does not necessarily mean that the radio frequency front ends will not be active at the same time. This type of execution organization may compliment the priority based management described above.

In various examples, even with priority and time domain management, the player network hub 106 may still see points in time where both the first and second wireless protocols and/or electronic front ends associated with the first and second wireless protocols are active at the same time. While this is happening, power consumption may be at a relative maximum, electrical noise may be at a relative maximum, and radio frequency interference may be at a relative maximum. In order to reduce or minimize the effects of these three factors on the design, three techniques may optionally be implemented to address them.

Regarding power consumption, power spikes can cause ground plane noise within the player network hub 106 as well as power supply droop. Power spikes may also also negatively affects usable battery life, as power rail droops can cause the player network hub 106 to reach a system shutdown voltage prematurely. The player network hub 106 may maximize the ground plane area available to each radio frequency system, e.g., the wireless communication tag 500 and the body area network hub 600, and isolate their respective ground planes from each other. Additionally, power supply decoupling capacitors may reduce or minimize the impact to the battery during periods of high peak power consumption. The player network hub 106 may, in various examples, pull large amounts of current for a period of microseconds before the load impacts the battery.

Regarding electrical noise, the player network hub 106 may incorporate return path routing designed to minimize the coupling of noise between the wireless communication tag 500 and the body area network hub 600, as well as providing filtering for power supplies to provide clean power reaches to the wireless communication tag 500 and the body area network hub 600. Regarding radio frequency interference, in various examples UWB covers frequencies from 3 GHz to 10 GHz, there is a potential to have interference with the BLE radio running at 2.4 GHz. UWB has rejection for narrow band systems built into the technology base of the protocol, as such the optimizations of the player network hub 106 around RF interference may be primarily focused on BLE performance. Antenna 502, 602 placement may be designed to minimize cross talk between the first and second wireless protocols, and design considerations may be implemented to ensure electrical and RF isolation, e.g., metal isolation and grounding measures. Additionally, one or both of the antennas 502, 602 may be selected that have orthogonal radio frequency patterns to minimize coupling of BLE energy into the UWB antenna, and vice versa.

Figure 9:
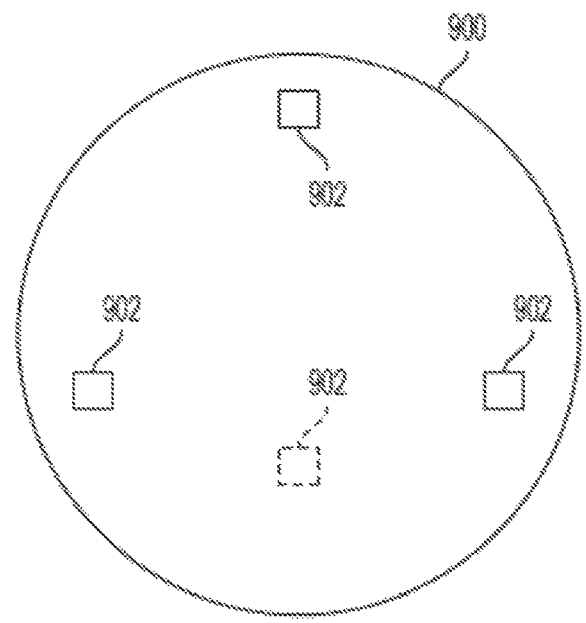
FIG. 9 is a depiction of a sport ball configured as an ancillary device, in an example embodiment.

FIG. 9 is a depiction of a sport ball 900 configured as an ancillary device 118, in an example embodiment. The sport ball 900 includes multiple short range wireless communication tags 902 configured to communicate with a peripheral device, such as the wrist-worn device 108 illustrated herein. In various examples, the tags 902 are configured to communicate according to a near field communication (NFC) protocol or according to any of a variety of other passive wireless protocols. In such examples, the wrist-worn device 108 is similarly configured to engage in active communication according to NFC or alternative modalities having a range of several inches or less.

When one or more of the tags 902 come within communication range of the wrist-worn device 108, wrist-worn device 108 detects the proximity of the tag 902 and, by extension, the sport ball 900. The wrist-worn device 108 may transmit information concerning the proximity of the sport ball 900 to the player network hub 106 starting when and for as long as the tag 900 is within communication range of the wrist-worn device 108. Based on the determined proximity of the sport ball 900 to the wrist-worn device 108 as received by the master network hub 112, the possession of the sport ball 900 by the player 200, whether sole or contested, may be inferred and analytics determined accordingly.

Figure 10:
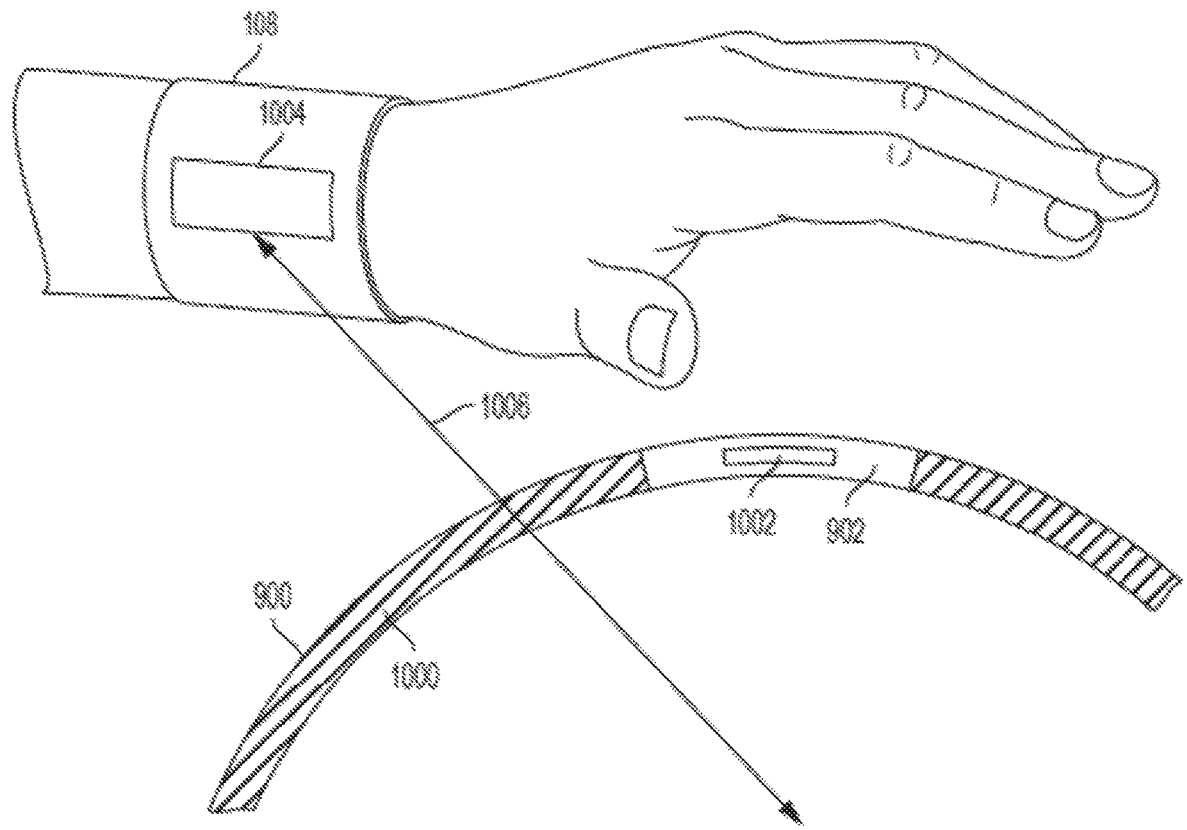
FIG. 10 is a depiction of a sport ball in proximity of a wrist-worn device and consequently part of a body area network, in an example embodiment.

FIG. 10 is a depiction of the sport ball 900 in proximity of the wrist-worn device 108 and consequently part of the body area network 102, in an example embodiment. In the illustrated example, a tag 902 is embedded in a skin 1000 of the sport ball 900. The tag 902 includes a coil 1002, such as a secondary coil. The wrist-worn device 108 energizes an antenna 1004, such as a primary coil, and, when the tag 902 is within communication range 1006 of the antenna 1004, the tag 902 is energized and transmits an acknowledgement signal and/or information regarding the sport ball 900, such as a sport ball 900 identification, to the antenna 1004 via the coil 1002. Upon receipt of the signal from the signal from the tag 902, the wrist-worn device 108 may transmit a signal via the body area network 102 indicating that the sport ball 900 has been detected and is in proximity of the wrist-worn device 108.

In various examples, the player 200 may wear a wrist-worn device 108 on each wrist to detect the proximity of the sport ball 900 regardless of which hand the player 200 may be using to control or attempt to control the sport ball 900. Further, while the above example was described with respect to a wrist-worn device 108, it is to be understood that any peripheral device 108 positioned anywhere on the player 200 may be utilized provided that the wireless protocol utilized between the peripheral device 108 and the sport ball 900, or ancillary device 118 in general, is sufficient to discriminate between a sport ball 900 that is close to the player 200 and a sport ball 900 for which it can be assumed the player is either controlling or seeking to control for the purposes of the game play. In an example, an ankle or foot-worn device is utilized in sporting events, such as soccer, in which the sport ball 900 is primarily controlled by a player's foot.

Figure 11:
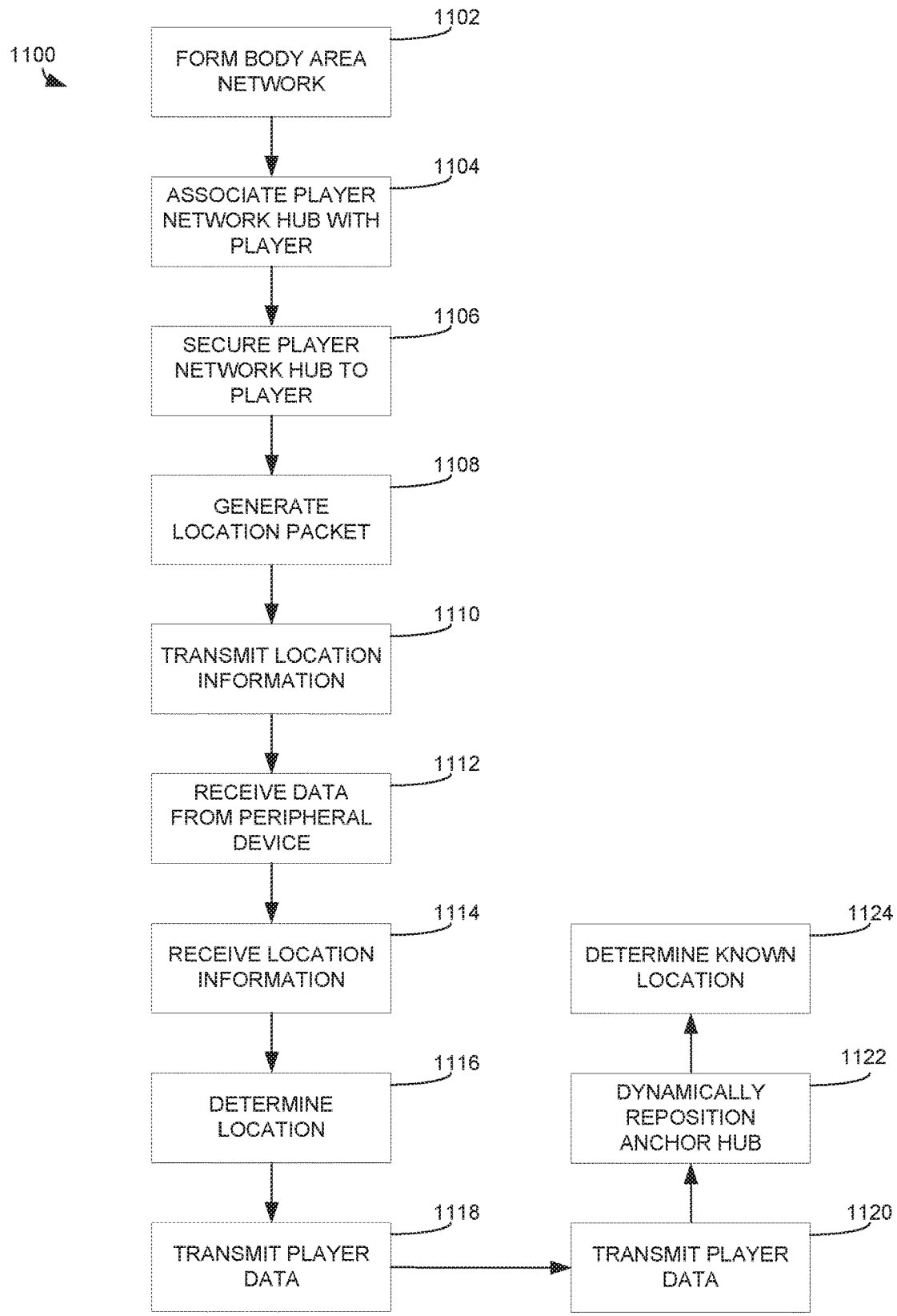
FIG. 11 is a flowchart for implementing a system, in an example embodiment.

FIG. 11 is a flowchart 1100 for implementing the system 100, in an example embodiment. While the flowchart 1100 is described with respect to the system 100 in particular, it is to be recognized and understood that the flowchart 1100 may be implemented with respect to any suitable system.

At 1102, a body area network is formed by a player network hub with peripheral devices by communicating wirelessly according to a first wireless protocol. In an example, at least one of the peripheral devices is configured to sense data regarding the. In an example, the body area network is formed with a body area network hub of the player network hub, the body area network hub configured to communicate according to the first wireless protocol. In an example, the body area network hub comprises an antenna and a communication module configured to communicate according to the first wireless protocol.

At 1104, the player network hub is associated with a player of an athletic event on the field of play. In an example, the peripheral devices are configured to be associated with the player. In an example, the player network hub is integrated in at least one of apparel or an article configured to be worn by the player.

At 1106, the player network hub is secured with respect to a player involved in an athletic activity.

At 1108, a location packet is generated with a location circuit.

At 1110, the player network hub transmits location information according to a second wireless protocol different than the first wireless protocol. In an example, transmitting the location information is via a wireless communication tag, coupled to the body area network hub, configured to communicate according to the second wireless protocol. In an example, transmitting the location information comprises transmitting the location packet to at least some of the relay network hubs according to the second wireless protocol.

At 1112, the data from the peripheral device is received by the player network hub according to the first wireless protocol. In an example, the data is physiologic data related to the player. In an example, the data is indicative of a proximity of an auxiliary device to one of the peripheral devices. In an example, the auxiliary device is equipment utilized in the athletic activity. At 1106, a wide area network is formed with the player network hub, relay network hubs, and a master network hub by communicating, at least in part, according to the second wireless protocol. The relay network hubs are configured to receive the location information from the player network hub and wherein at least one of the relay network hubs or the master network hub are configured to determine a location of the player network hub based on the location information. In an example, the relay network hubs each have a relative known location with respect to a reference and wherein the at least one of the relay network hubs or the master network hub are configured to determine a location of the player network hub according to the reference. In an example, at least one of the relay network hubs are in a fixed position relative to the reference. In an example, the reference is the field of play.

In an example, the relay network hubs each further comprise a wireless communication tag comprising the antenna, the location circuit, a data port, and a microcontroller configured to manage the location circuit and data reception and transmission via the data port. IN an example, the player network hub comprises the wireless communication tag, wherein transmitting the location information comprises transmitting a data packet to the relay network hubs via the antenna, and wherein determining a distance between the player network hub and the relay network hub is based on the data packet.

At 1114, the location information is received via an antenna of the relay network hub configured to communicate according to the second wireless protocol. In an example, the location information is based on a distance between the player network hub and the relay network hub.

At 1116, the location is determined with a location circuit of the relay network hub. In an example, determining the location of the player network hub is by triangulating the distance information determined by the location circuit of multiple ones of the relay network hubs.

At 1118, the data regarding the player is transmitted from the player network hub to at least one of the relay network hubs.

At 1120, the data regarding the player is transmitted form the at least one relay network hub to the master network hub, wherein the master network hub is configured to at least one of determine analytics based on the data and cause the data to be presented on a user interface At 1122, at least one of the relay network hubs are dynamically repositioned relative to the reference. In an example, dynamically repositioning the at least one relay network hub is along a constraining apparatus. In an example, the at least one relay network hub is a component of an autonomous vehicle configured and dynamically repositioning the at least one relay network hub includes the autonomous vehicle repositioning with respect to the reference.

In an example, dynamically repositioning the at least one relay network hub is based, at least in part, on movement of the player network hub with respect to the reference. In an example, the reference is a field of play, wherein the player network hub is associated with and secured with respect to a player engaged in an athletic activity on the field of player, and dynamically repositioning the at least one relay network hub is based, at least in part, on movement by the player on the field of play. In an example, dynamically repositioning the at least one relay network hub includes maintaining the relay network hub in communication range of the relay network hub.

At 1124, the known location is determined based on a current position of the at least one of the relay network hubs.

EXAMPLES

In Example 1, a system includes a player network hub configured to form a body area network with peripheral devices by communicating wirelessly according to a first wireless protocol and transmit location information according to a second wireless protocol different than the first wireless protocol, and relay network hubs configured to form a wide area network with the player network hub and a master network hub by communicating, at least in part, according to the second wireless protocol, wherein the relay network hubs are configured to receive the location information from the player network hub and wherein at least one of the relay network hubs or the master network hub are configured to determine a location of the player network hub based on the location information.

In Example 2, the system of Example 1 optionally further includes that the relay network hubs each have a relative known location with respect to a reference and wherein the at least one of the relay network hubs or the master network hub are configured to determine a location of the player network hub according to the reference.

In Example 3, the system of any one or more of Examples 1 and 2 optionally further include that at least one of the relay network hubs are in a fixed position relative to the reference.

In Example 4, the system of any one or more of Examples 1-3 optionally further includes that at least one of the relay network hubs are dynamically repositionable relative to the reference and are configured to determine the known location based on a current position of the at least one of the relay network hubs.

In Example 5, the system of any one or more of Examples 1-4 optionally further includes that the at least one relay network hub is dynamically repositionable along a constraining apparatus.

In Example 6, the system of any one or more of Examples 1-5 optionally further includes that the at least one relay network hub is a component of an autonomous vehicle configured to be dynamically repositionable with respect to the reference.

In Example 7, the system of any one or more of Examples 1-6 optionally further includes that the at least one relay network hub is configured to be dynamically repositionable based, at least in part, on movement of the player network hub with respect to the reference.

In Example 8, the system of any one or more of Examples 1-7 optionally further includes that the reference is a field of play, wherein the player network hub is configured to be associated with and secured with respect to a player engaged in an athletic activity on the field of player, and wherein the at least one relay network hub is configured to be dynamically repositioned based, at least in part, on movement by the player on the field of play.

In Example 9, the system of any one or more of Examples 1-8 optionally further includes that the at least one relay network hub is configured to be dynamically repositionable to remain in communication range of the relay network hub.

In Example 10, the system of any one or more of Examples 1-9 optionally further includes that the reference is a field of play and wherein the player network hub configured to be associated with a player of an athletic event on the field of play.

In Example 11, the system of any one or more of Examples 1-10 optionally further includes that the peripheral devices are configured to be associated with the player.

In Example 12, the system of any one or more of Examples 1-11 optionally further includes that at least one of the peripheral devices is configured to sense data regarding the player and transmit the data to the player network hubs according to the first wireless protocol.

In Example 13, the system of any one or more of Examples 1-12 optionally further includes that the player network hub is configured to transit the data to at least one of the relay network hubs, the at least one relay network hubs are configured to transmit the data regarding the player to the master network hub, and the master network hub is configured to at least one of determine analytics based on the data and cause the data to be presented on a user interface.

In Example 14, the system of any one or more of Examples 1-13 optionally further includes that the relay network hubs comprise an antenna configured to communicate according to the second wireless protocol and a location circuit configured to determine the location information.

In Example 15, the system of any one or more of Examples 1-14 optionally further includes that the location information is based on a distance between the player network hub and the relay network hub.

In Example 16, the system of any one or more of Examples 1-15 optionally further includes that the at least one of the relay network hubs or the master network hub are configured to determine the location of the player network hub by triangulating the distance information determined by the location circuit of multiple ones of the relay network hubs.

In Example 17, the system of any one or more of Examples 1-16 optionally further includes that the relay network hubs each further comprise a wireless communication tag comprising the antenna, the location circuit, a data port, and a microcontroller configured to manage the location circuit and data reception and transmission via the data port.

In Example 18, the system of any one or more of Examples 1-17 optionally further includes that the player network hub comprises the wireless communication tag, wherein the location circuit is configured to transmit a data packet to the relay network hubs via the antenna, and wherein the location circuit of the relay network hub is configured to determine a distance between the player network hub and the relay network hub based on the data packet.

In Example 19, the system of any one or more of Examples 1-18 optionally further includes that the player network hub comprises a body area network hub configured to communicate according to the first wireless protocol and a wireless communication tag, coupled to the body area network hub, configured to communicate according to the second wireless protocol.

In Example 20, the system of any one or more of Examples 1-19 optionally further includes that the body area network hub comprises an antenna and a communication module configured to communicate according to the first wireless protocol.

In Example 21, the system of any one or more of Examples 1-20 optionally further includes that the wireless communication tag comprises a location circuit configured to generate a location packet and an antenna configured to transmit the location packet to at least some of the relay network hubs according to the second wireless protocol.

In Example 22, the system of any one or more of Examples 1-21 optionally further includes that the player network hub is configured to be secured with respect to a player involved in an athletic activity.

In Example 23, the system of any one or more of Examples 1-22 optionally further includes that the player network hub is configured to receive data transmitted form the peripheral devices and transmit the data to at least one of the relay network hubs.

In Example 24, the system of any one or more of Examples 1-23 optionally further includes that the data is physiologic data related to the player.

In Example 25, the system of any one or more of Examples 1-24 optionally further includes that the data is indicative of a proximity of an auxiliary device to one of the peripheral devices.

In Example 26, the system of any one or more of Examples 1-25 optionally further includes that the auxiliary device is equipment utilized in the athletic activity.

In Example 27, the system of any one or more of Examples 1-26 optionally further includes that the player network hub is integrated in at least one of apparel or an article configured to be worn by the player.

In Example 28, a player network hub comprises the player network hub of any one or more of Examples 1-27.

In Example 29, an relay network hub includes one of the relay network hubs of any one or more of Examples 1-27.

In Example 30, a peripheral device comprises one of the peripheral devices of any one or more of Examples 1-27.

In Example 31, a master hub device comprises the master hub device of any one or more of Examples 1-27.

In Example 32, a method comprises forming, with a player network hub, a body area network with peripheral devices by communicating wirelessly according to a first wireless protocol, transmitting, with the player network hub, location information according to a second wireless protocol different than the first wireless protocol, and forming, with relay network hubs, a wide area network with the player network hub and a master network hub by communicating, at least in part, according to the second wireless protocol, wherein the relay network hubs are configured to receive the location information from the player network hub and wherein at least one of the relay network hubs or the master network hub are configured to determine a location of the player network hub based on the location information.

In Example 33, the method of Example 32 optionally further includes that the relay network hubs each have a relative known location with respect to a reference and wherein the at least one of the relay network hubs or the master network hub are configured to determine a location of the player network hub according to the reference.

In Example 34, the method of any one or more of Examples 32 and 33 optionally further include that at least one of the relay network hubs are in a fixed position relative to the reference.

In Example 35, the method of any one or more of Examples 32-34 optionally further includes dynamically repositioning at least one of the relay network hubs relative to the reference and determining the known location based on a current position of the at least one of the relay network hubs.

In Example 36, the method of any one or more of Examples 32-35 optionally further includes that dynamically repositioning the at least one relay network hub is along a constraining apparatus.

In Example 37, the method of any one or more of Examples 32-36 optionally further includes that the at least one relay network hub is a component of an autonomous vehicle configured and dynamically repositioning the at least one relay network hub includes the autonomous vehicle repositioning with respect to the reference.

In Example 38, the method of any one or more of Examples 32-37 optionally further includes that dynamically repositioning the at least one relay network hub is based, at least in part, on movement of the player network hub with respect to the reference.

In Example 39, the method of any one or more of Examples 32-38 optionally further includes that the reference is a field of play, wherein the player network hub is associated with and secured with respect to a player engaged in an athletic activity on the field of player, and dynamically repositioning the at least one relay network hub is based, at least in part, on movement by the player on the field of play.

In Example 40, the method of any one or more of Examples 32-39 optionally further includes that dynamically repositioning the at least one relay network hub includes maintaining the relay network hub in communication range of the relay network hub.

In Example 41, the method of any one or more of Examples 32-40 optionally further includes that the reference is a field of play and further comprising associating the player network hub with a player of an athletic event on the field of play.

In Example 42, the method of any one or more of Examples 32-41 optionally further includes that the peripheral devices are configured to be associated with the player.

In Example 43, the method of any one or more of Examples 32-42 optionally further includes that at least one of the peripheral devices is configured to sense data regarding the player and further comprising receiving the data by the player network hub according to the first wireless protocol.

In Example 44, the method of any one or more of Examples 32-43 optionally further includes transmitting the data regarding the player from the player network hub to at least one of the relay network hubs and transmitting the data regarding the player form the at least one relay network hub to the master network hub, wherein the master network hub is configured to at least one of determine analytics based on the data and cause the data to be presented on a user interface.

In Example 45, the method of any one or more of Examples 32-44 optionally further includes receiving the location information via an antenna of the relay network hub configured to communicate according to the second wireless protocol and determining, with a location circuit of the relay network hub, the location.

In Example 46, the method of any one or more of Examples 32-45 optionally further includes determining the location of the player network hub is by triangulating the distance information determined by the location circuit of multiple ones of the relay network hubs.

In Example 47, the method of any one or more of Examples 32-46 optionally further includes that the relay network hubs each further comprise a wireless communication tag comprising the antenna, the location circuit, a data port, and a microcontroller configured to manage the location circuit and data reception and transmission via the data port.

In Example 48, the method of any one or more of Examples 32-47 optionally further includes that the player network hub comprises the wireless communication tag, wherein transmitting the location information comprises transmitting a data packet to the relay network hubs via the antenna, and wherein determining a distance between the player network hub and the relay network hub is based on the data packet.

In Example 49, the method of any one or more of Examples 32-48 optionally further includes that forming the body area network is with a body area network hub of the player network hub, the body area network hub configured to communicate according to the first wireless protocol and transmitting the location information is via a wireless communication tag, coupled to the body area network hub, configured to communicate according to the second wireless protocol.

In Example 50, the method of any one or more of Examples 32-49 optionally further includes that the body area network hub comprises an antenna and a communication module configured to communicate according to the first wireless protocol.

In Example 51, the method of any one or more of Examples 32-50 optionally further includes generating, with a location circuit, a location packet, wherein transmitting the location information comprises transmitting the location packet to at least some of the relay network hubs according to the second wireless protocol.

In Example 52, the method of any one or more of Examples 32-51 optionally further includes securing the player network hub with respect to a player involved in an athletic activity.

In Example 53, the method of any one or more of Examples 32-52 optionally further includes receiving, with the player network hub, data transmitted form the peripheral devices and transmit the data to at least one of the relay network hubs.

In Example 54, the method of any one or more of Examples 32-53 optionally further includes that the data is physiologic data related to the player.

In Example 55, the method of any one or more of Examples 32-54 optionally further includes that the data is indicative of a proximity of an auxiliary device to one of the peripheral devices.

In Example 56, the method of any one or more of Examples 32-55 optionally further includes that the auxiliary device is equipment utilized in the athletic activity.

In Example 57, the method of any one or more of Examples 32-56 optionally further includes that the player network hub is integrated in at least one of apparel or an article configured to be worn by the player As used herein, the term "memory" refers to a machine-readable medium able to store data temporarily or permanently and may be taken to include, but not be limited to, random-access memory (RAM), read-only memory (ROM), buffer memory, flash memory, ferroelectric RAM (FRAM), and cache memory. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., software) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A system, comprising:
    a player network hub configured to:
        form a body area network with peripheral devices by communicating wirelessly according to a first wireless protocol; and
        transmit location information according to a second wireless protocol different than the first wireless protocol; and
    relay network hubs configured to form a wide area network with the player network hub and a master network hub by communicating, at least in part, according to the second wireless protocol, wherein the relay network hubs are configured to receive the location information from the player network hub and wherein at least one of the relay network hubs or the master network hub are configured to determine a location of the player network hub based on the location information;
    wherein the relay network hubs each have a relative known location with respect to a field of play, and wherein the at least one of the relay network hubs or the master network hub are configured to determine a location of the player network hub on the field of play;
    wherein at least one of the relay network hubs are dynamically repositionable relative to the field of play and are configured to determine the location of the player network hub on the field of play based on a current position of the at least one of the relay network hubs; and
    wherein the at least one relay network hub is a component of an autonomous vehicle and is configured to be dynamically repositionable to change from a first physical location to another physical location with respect to: the field of play; movement of the player network hub within the field of play; and signal range distance relative to the relay network hub to transmit or receive wireless data packets with the relay network hub.

2. The system of claim 1, wherein at least one of the relay network hubs are in a fixed position relative to the field of play.

3. The system of claim 1, wherein the at least one relay network hub is dynamically repositionable along a constraining apparatus.

4. The system of claim 1, wherein the player network hub is configured to be associated with and secured with respect to a player engaged in an athletic activity on the field of player, and wherein the at least one relay network hub is configured to be dynamically repositioned based, at least in part, on movement by the player on the field of play.

5. The system of claim 1, wherein the player network hub configured to be associated with a player of an athletic event on the field of play.

6. The system of claim 5, wherein the peripheral devices are configured to be associated with the player.

7. The system of claim 6, wherein at least one of the peripheral devices is configured to sense data regarding the player and transmit the data to the player network hubs according to the first wireless protocol.

8. The system of claim 7, wherein:
    the player network hub is configured to transit the data to at least one of the relay network hubs;
    the at least one relay network hubs are configured to transmit the data regardi: the player to the master network hub; and
    the master network hub is configured to at least one of determine analytics based on the data and cause the data to be presented on a user interface.

9. The system of claim 1, wherein the relay network hubs comprise:
    an antenna configured to communicate according to the second wireless protocol; and
    a location circuit configured to determine the location information.

10. The system of claim 9, wherein location information is based on a distance between the player network hub and the relay network hub.

11. The system of claim 10, wherein the at least one of the relay network hubs or the master network hub are configured to determine the location of the player network hub by triangulating the distance information determined by the location circuit of multiple ones of the relay network hubs.

12. The system of claim 9, wherein the relay network hubs each further comprise a wireless communication tag comprising the antenna, the location circuit, a data port, and a microcontroller configured to manage the location circuit and data reception and transmission via the data port.

13. The system of claim 12, wherein the player network hub comprises the wireless communication tag, wherein the location circuit is configured to transmit a data packet to the relay network hubs via the antenna, and wherein the location circuit of the relay network hub is configured to determine a distance between the player network hub and the relay network hub based on the data packet.

14. The system of claim 1, wherein the player network hub comprises:
    a body area network hub configured to communicate according to the first wireless protocol; and
    a wireless communication tag, coupled to the body area network hub, configured to communicate according to the second wireless protocol.

15. The system of claim 14, wherein the body area network hub comprises an antenna and a communication module configured to communicate according to the first wireless protocol.

16. The system of claim 15, wherein the wireless communication tag comprises:
a location circuit configured to generate a location packet,
an antenna configured to transmit the location packet to at least some of the relay network hubs according to the second wireless protocol.

17. The system of claim 1, wherein the player network hub is configured to be secured with respect to a player involved in an athletic activity.

18. The system of claim 17, wherein the player network hub is configured to receive data transmitted form the peripheral devices and transmit the data to at least one of the relay network hubs.

19. The system of claim 18, wherein the data is physiologic data related to the player.

20. The system of claim 18, wherein the data is indicative of a proximity of an auxiliary device to one of the peripheral devices.

21. The system of claim 20, wherein the auxiliary device is equipment utilized in the athletic activity.

22. The system of claim 17, wherein the player network hub is integrated in at least one of apparel or an article configured to be worn by the player.

23. A method, comprising:
forming, with a player network hub, a body area network with peripheral devices by communicating wirelessly according to a first wireless protocol;
transmitting, with the player network hub, location information according to a second wireless protocol different than the first wireless protocol;
forming, with relay network hubs, a wide area network with the player network hub and a master network hub by communicating, at least in part, according to the second wireless protocol, wherein the relay network hubs are configured to receive the location information from the player network hub and wherein at least one of the relay network hubs or the master network hub are configured to determine a location of the player network hub based on the location information, wherein the relay network hubs each have a relative known location with respect to a field of play, and wherein the at least one of the relay network hubs or the master network hub are configured to determine a location of the player network hub on the field of play;
dynamically repositioning to change from a first physical location to another physical location at least one of the relay network hubs relative to the field of play; and
determining the relative known location based on a current position of the at least one of the relay network hubs; and
wherein the at least one relay network hub is a component of an autonomous vehicle and is configured to be dynamically repositionabie with respect to: the field of play; movement of the player network hub within the field of play; and signal range distance relative to the relay network hub to transmit or receive wireless data packets with the relay network hub.

24. The method of claim 23, wherein at least one of the relay network hubs are in a fixed position relative to the field of play.

25. The method of claim 23, wherein dynamically repositioning the at least one relay network hub is along a constraining apparatus.

26. The method of claim 23, wherein the reference is a field of play, wherein the player network hub is associated with and secured with respect to a player engaged in an athletic activity on the field of player, and dynamically repositioning the at least one relay network hub is based, at least in part, on movement by the player on the field of play.

27. The method of claim 23, further comprising associating the player network hub with a player of an athletic event on the field of play.

28. The method of claim 27, wherein the peripheral devices are configured to be associated with the player.

29. The method of claim 28, wherein at least one of the peripheral devices is configured to sense data regarding the player and further comprising:
receiving the data by the player network hub according to the first wireless protocol.

30. The method of claim 29, further comprising:
transmitting the data regarding the player from the player network hub to at least one of the relay network hubs, and
transmitting the data regarding the player form the at least one relay network hub to the master network hub, wherein the master network huh is configured to at least one of determine analytics based on the data and cause the data to be presented on a user interface.

31. The method of claim 23, further comprising:
receiving the location information via an antenna of the relay network hub configured to communicate according to the second wireless protocol, and
determining, with a location circuit of the relay network .b, the location.

32. The method of claim 31, wherein the location information is based on a distance between the player network hub and the relay network hub.

33. The method of claim 32, wherein determining the location of the player network hub is by triangulating the distance information determined by the location circuit of multiple ones of the relay network hubs.

34. The method of claim 31, wherein the relay network hubs each further comprise a wireless communication tag comprising the antenna, the location circuit, a data port, and a microcontroller configured to manage the location circuit and data reception and transmission via the data port.

35. The method of claim 34, wherein the player network hub comprises the wireless communication tag, wherein transmitting the location information comprises transmitting a data packet to the relay network hubs via the antenna, and wherein determining a distance between the player network hub and the relay network hub is based on the data packet.

36. The method of claim 23, wherein:
forming the body area network is with a body area network hub of the player network hub, the body area network hub configured to communicate according to the first wireless protocol; and
wherein transmitting the location information is via a wireless communication tag, coupled to the body area network hub, configured to communicate according to the second wireless protocol.

37. The method of claim 36, wherein the body area network hub comprises an antenna and a communication module configured to communicate according to the first wireless protocol.

38. The method of claim 37, further comprising:
generating, with a location circuit, a location packet,
wherein transmitting the location information comprises transmitting the location packet to at least some of the relay network hubs according to the second wireless protocol.

39. The method of claim 23, further comprising securing the player network hub with espect to a player involved in an athletic activity.

40. The method of claim 39, further comprising receiving, with the player network hub, data transmitted form the peripheral devices and transmit the data to at least one of the relay network hubs.

41. The method of claim 40, wherein the data is physiologic data related to the player.

42. Tire method of claim 40, wherein the data is indicative of a proximity of an auxiliary device to one of the peripheral devices.

43. The method of claim 42, wherein the auxiliary device is equipment utilized in the athletic activity.

44. The method of claim 39, wherein the player network hub is integrated in at least one of apparel or an article configured to be worn by the player.

\* \* \* \* \*

UNITED STATES PATENT AND TRADEMARK OFFICE
CERTIFICATE OF CORRECTION

PATENT NO. : 11,096,140 B2
APPLICATION NO. : 15/774084
DATED : August 17, 2021
INVENTOR(S) : Andon et al.

It is certified that error appears in the above-identified patent and that said Letters Patent is hereby corrected as shown below:

In the Claims

In Column 22, Line 26, in Claim 8, delete "regardi:" and insert --regarding-- therefor In Column 23, Line 53, in Claim 23, delete "repositionabie" and insert --repositionable-- therefor In Column 24, Line 19, in Claim 30, delete "huh" and insert --hub-- therefor In Column 24, Line 27, in Claim 31, delete ".b," and insert --hub,-- therefor In Column 24, Line 66, in Claim 39, delete "espect" and insert --respect-- therefor In Column 25, Line 7, in Claim 42, delete "Tire" and insert --The-- therefor Signed and Sealed this
Thirteenth Day of September, 2022

Katherine Kelly Vidal
*Director of the United States Patent and Trademark Office*